Oct. 9, 1934.  W. STEINBERG  1,976,417
VALVE CONTROL MEANS
Filed Aug. 11, 1930  5 Sheets-Sheet 1
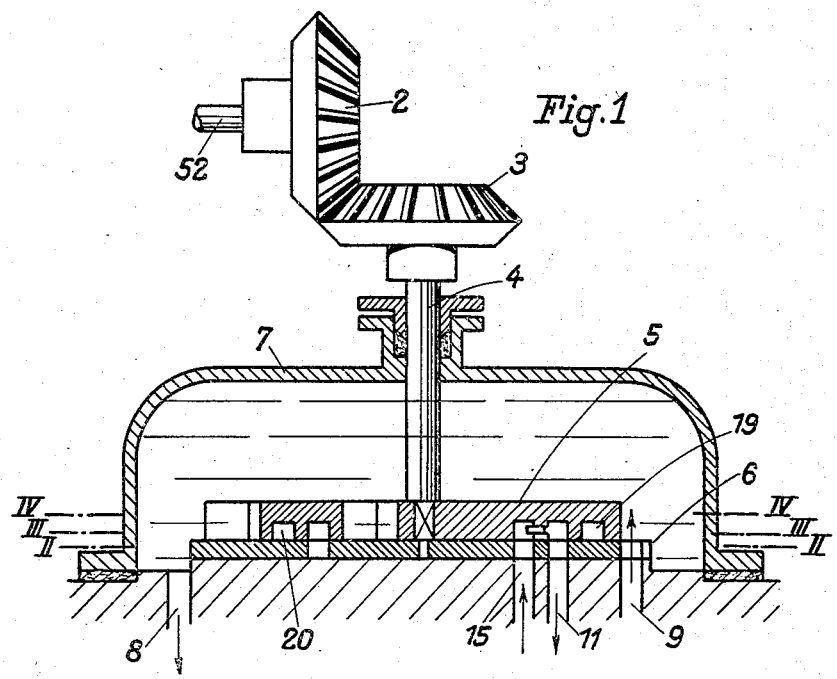
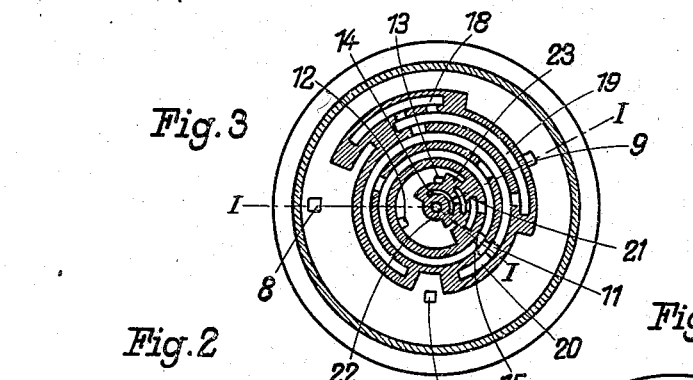
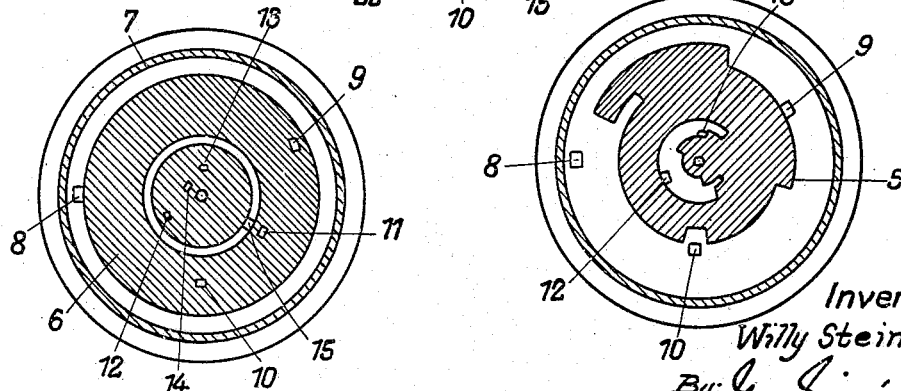
Inventor:
Willy Steinberg
By: *[signature]*
Atty.

Oct. 9, 1934.　　　W. STEINBERG　　　1,976,417
VALVE CONTROL MEANS
Filed Aug. 11, 1930　　5 Sheets-Sheet 2

Inventor:
Willy Steinberg
By: [signature]
Atty.

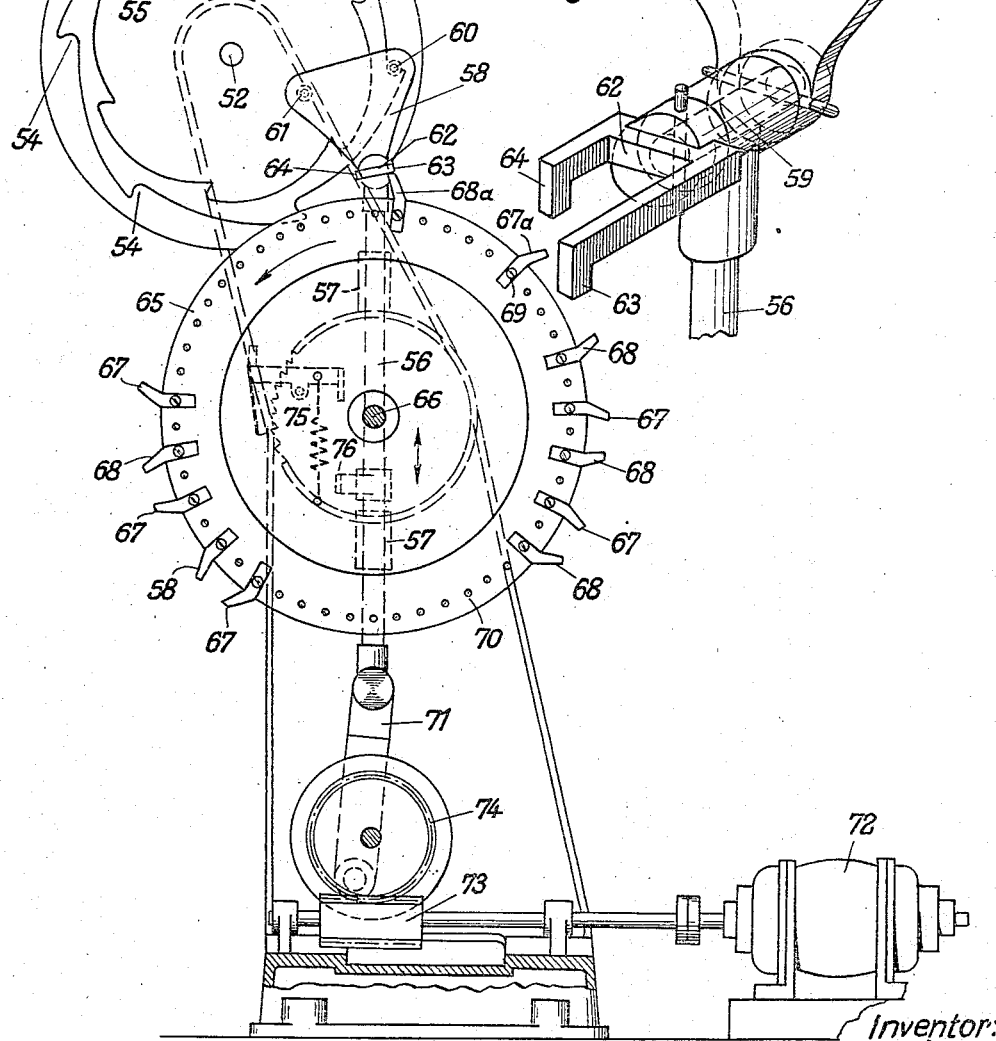

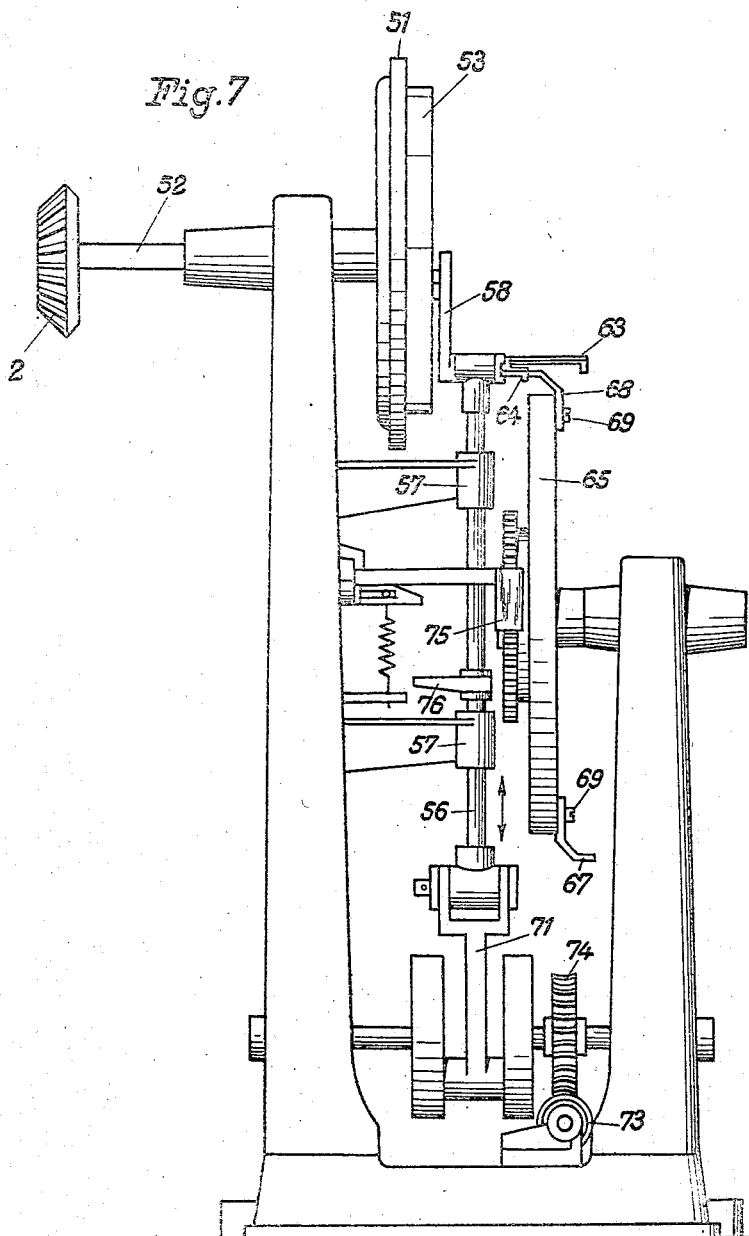

Patented Oct. 9, 1934

1,976,417

UNITED STATES PATENT OFFICE 1,976,417

VALVE CONTROL MEANS

Willy Steinberg, Berlin, Germany

Application August 11, 1930, Serial No. 474,563
In Germany August 22, 1929

12 Claims. (Cl. 137—146)

The present invention relates to slide valves, and more particularly to a method of controlling the same.

As an auxiliary means for the actuation of large slides or valves it is usual to employ a pressure agent or fluid, and in this manner the actuation of a relatively large slide or valve may be performed by the actuation of smaller valves, which merely require to control the pressure agent or fluid employed. This method of operation offers particular advantages if a plurality of relatively large valves require manipulation, in which case no great difficulty will be encountered in performing the control of the pressure agent or fluid automatically.

It is the primary object of the present invention to provide an automatic control of the type referred to.

Other objects and advantages obtained will become apparent as the description proceeds.

The arrangement according to the invention enables the automatic control of the pressure agent or fluid to be performed in extremely simple manner, and there is provided on the one hand a special control means for governing the ratio of time between the single operations, which means comprises in substance a disc having annular slots for regulating the intake and discharge of the pressure agent, and on the other hand a means, consisting for example of an abutment wheel, for regulating, as regards time, the successive order of the single control operations.

A further object of the invention is the provision of a device for the intermittent movement of this rotary slide valve.

In water-gas plants in which carburetted water-gas is generated twelve control operations are required as follows:

(1) The closing of the steam cock, (2) the opening of the primary air slide valve, (3) the opening of the exhaust gas valve, (4) the opening of the secondary air slide valve, (5) the closing of the primary air slide valve, (6) the opening of the steam cock, (7) the closing of the secondary air slide valve, (8) the closing of the exhaust gas valve, (9) the opening of the oil cock, (10) the closing of the hot gas slide valve, (11) the opening of the hot gas slide valves, and (12) the closing of the oil cock.

These twelve operations in the control are performed according to this invention by only one actuating device, which is preferably constructed in the manner of a rotary slide valve.

In a construction of this nature care requires to be taken that the single control operations performed by the valves of the water gas plant overlap, so that, for example, one valve is opened and closed, while another valve may remain open the whole time. Thus, for example, the slide valve through which the hot gases leave the water-gas generator requires to be open for an appreciable duration, as the same allows the passage not only of the water-gas generated but also of the hot blow gas. This will be dealt with more concisely later.

The rotary slide valve according to this invention comprises two plates, in the one of which there is provided a series of concentrically arranged annular passages or recesses of different circumferential length, and in the other intakes and discharges for the pressure agent from or to the single control cylinders actuating the single valves of the plant. If now the slide plate furnished with the passages or recesses is rotated over the base plate having the intakes and discharges, the passageways are on the one occasion covered and on the other occasion uncovered by the plate having the annular passages. By this way the pressure agent is on the one occasion conveyed to a cylinder which controls a slide valve of the plant and initiates the movement of the piston and of the valve connected to it in one direction, whereas on the other occasion the pressure agent is discharged from the controlling cylinder whereby the movement of the piston takes place in the opposite direction.

The slide plate of this control valve is to be turned by a constant angle at certain intervals which, however, differ from each other. According to this invention this intermittent movement is attained by coupling the control valve by means of bevel gears or in other suitable fashion to a disk provided with recesses which disk is advanced intermittently and suddenly by a constant angle by means of an engaging device which carries two abutments coacting with the recesses in the disk. This engaging device is moved up and down in uniform manner and its abutments are coupled with the disk at predetermined intervals thus effecting the advance movement of the disk. This coupling at predetermined intervals is effected by means of a uniformly revolving wheel which carries on its circumference a series of abutments. The distance between these abutments and thereby the intervals between the advance movements of the disk and the control valve connected to it are adjustable.

The invention will be described more fully with reference to the accompanying drawings in which:

Figure 1 is a vertical section through the rotary slide valve along the line I—I—I in Figure 3.

Figure 2 is a section along the line II—II in Figure 1.

Figure 3 is a section along the line III—III in Figure 1.

Figure 4a—4m show diagrammatically the position of the plate having the annular passages in respect of the twelve consecutive operations.

Figure 5:
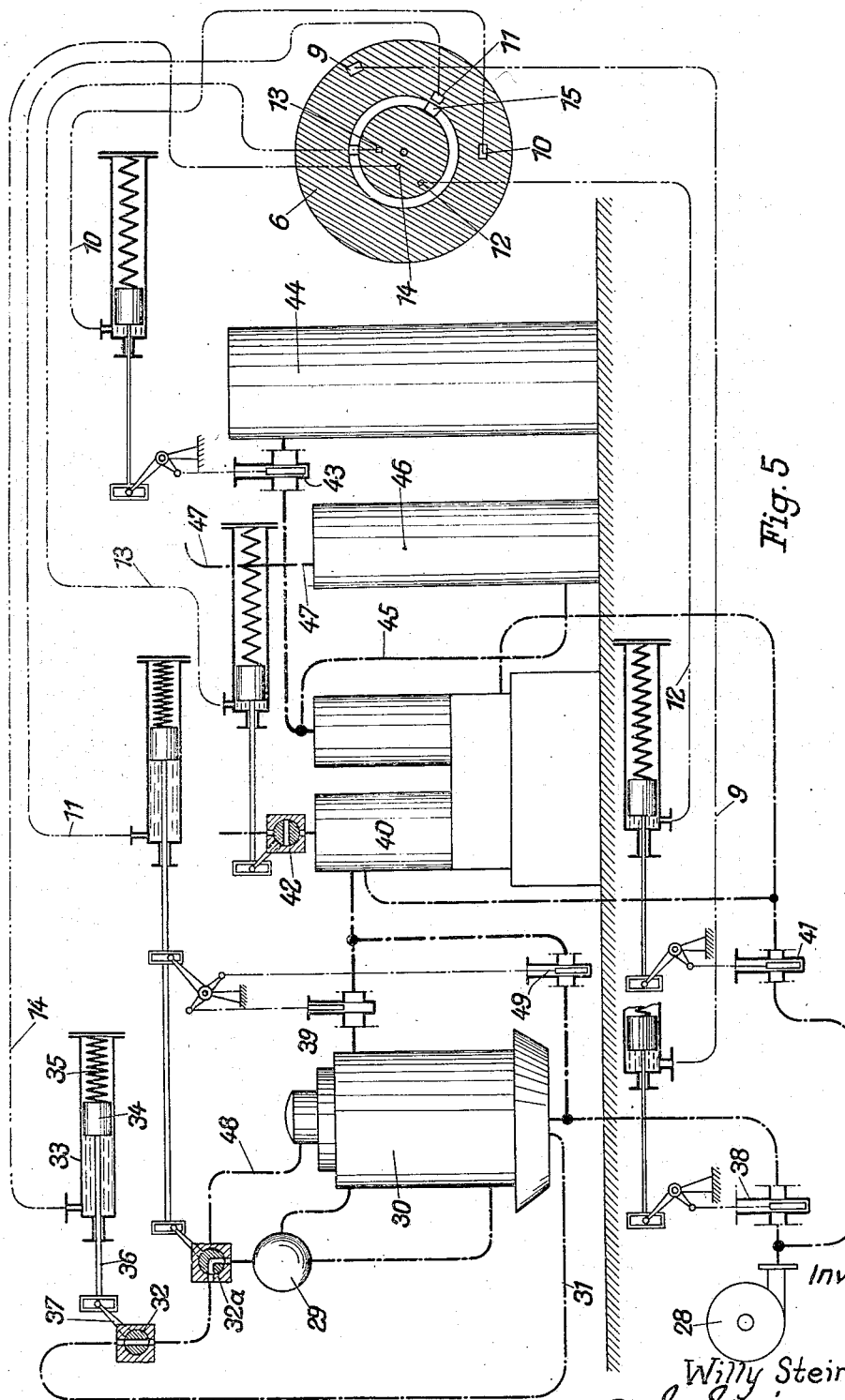

Figure 5 shows in diagrammatical form the rotary slide valve in conjunction with a water-gas generating plant.

Figure 6 shows the device for intermittently moving the rotary slide valve.

Figure 7 being an end view of the device and

Figure 8 showing a detail of this device.

According to Figure 1, the plate 5 receives its motion through the medium of the bevel wheels 2 and 3 and the shaft 4. This plate 5 possesses annular passages underneath, and revolves over the fixed plate 6. The two plates are surrounded by a casing 7, from which the oil is capable of being discharged through the pipe 8.

In the plate 6 there are provided the pipes 9—14. These pipes 9—14 lead to the single cylinders, which are controlled by the pressure agent and in turn control the corresponding valves of the water-gas plant. There is also provided in the plate 6 an additional pipe 15, through which the pressure oil is introduced.

The pipes proceeding from the plate 6 are to be recognized in Figure 2. The oil is enabled to flow off from the respective control cylinders through those pipes which are not covered by the plate 5. This occurs, for example, by reason of the fact that the pistons actuating the valves of the plant are pressed by the pressure agent against a spring. Immediately the pressure is removed, the oil is forced back through the pipes, whereby the single slide valves may be opened or closed.

In Figure 3 there are shown the passages in the plate 5. Immediately one of the openings 9—14 is connected to the pressure oil inlet tube 15 by means of one of these annular passages the pressure agent is conveyed through the corresponding pipes to the control cylinder. The pressure agent proceeds from a pump (not shown) through the pipe 15, and flows into the single annular passages and from there into the corresponding pipes. The outermost annular passage 18 would actuate, for example, the primary air slide valve. The passage 19 actuates the exhaust gas valve, the passage 20 the hot gas slide valve, the passage 21 the secondary air slide valve, the passage 22 the oil cock, and the passage 23 the steam cock.

The co-operation between the single annular recesses and the pipes leading to the control cylinders is shown in Figures 4a—4m.

Figure 4A:
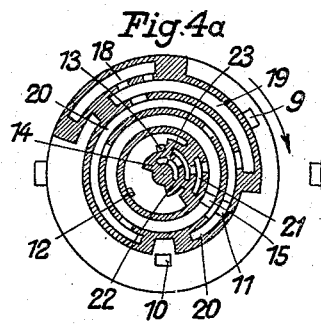
Figure 4 is a section along the line IV—IV in Figure 1.

In Figure 4a, for example, the following valves would be open:

(1) The hot-gas slide valve, which is controlled by the annular passage 20 and the pipe 11, and
(2) the steam cock, which is controlled by the annular passage 23 and the pipe 14.

All remaining pipes are situated outside of the plate 5, so that by means of the spring at the control cylinder the oil is forced back through the pipes and the valves are closed.

Figure 4B:
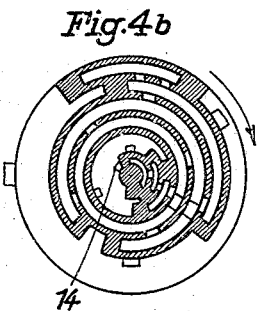

If the plate 5 is turned by 30°, the same assumes the position indicated in Figure 4b. It will be seen that the pipe 14 is now situated outside of the plate 5, and in this manner the first operation above referred to is performed, viz., the closing of the steam cock.

Figure 4C:
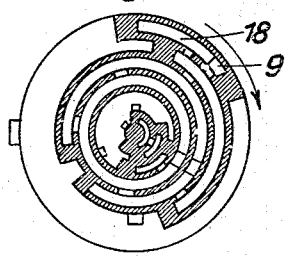

In Figure 4c the plate 5 was turned again by 30°, so that the opening 9 is now situated within the annular passage 18, causing the opening of the primary air slide valve.

Figure 4D:
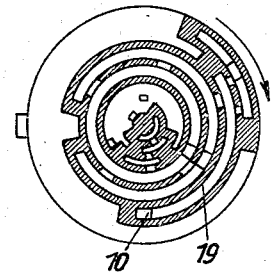

In Figure 4d the pipe 10 moves below the passage 19, as a result of which the waste-gas slide valve is opened.

Figure 4E:
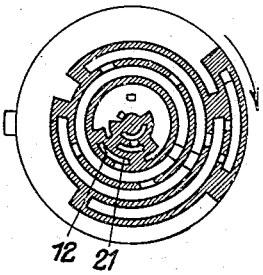
Figure 4F:
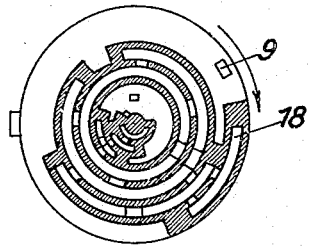

In Figure 4e the aperture 12 moves below the passage 21, causing the opening of the secondary air slide valve.

In Figure 4f the opening 9 has again been released by the passage 18, so that the oil is able to flow off and closes the primary air slide valve.

Figure 4G:
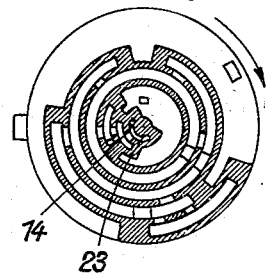

In Figure 4g the opening 14 has just moved below the passage 23, so that the steam cock is opened.

Figure 4H:
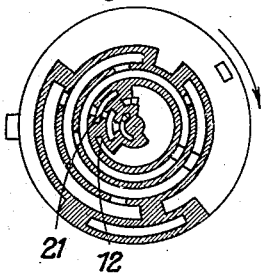

In Figure 4h the opening 12 has been uncovered by the annular passage 21, so that the secondary air slide valve is thus closed.

Figure 4I:
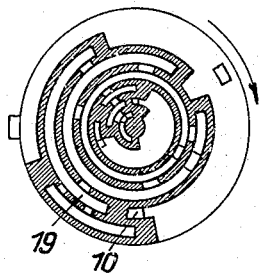

In Figure 4i the pipe 10 is no longer covered by the passage 19, so that in consequence the waste-gas slide valve is closed.

Figure 4K:
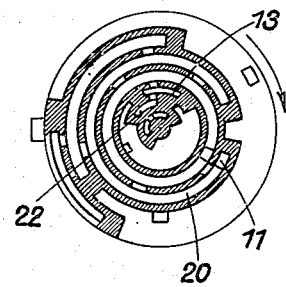

In Figure 4k the opening 13 is covered by the annular passage 22, so that the oil cock may accordingly be opened. During the whole of this time the hot-gas slide valve, which is controlled by the pipe 11 and the annular passage 20, has been open.

Figure 4L:
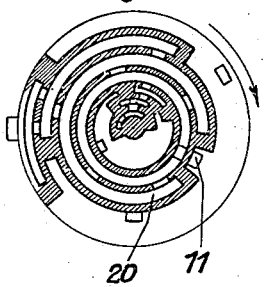

In Figure 4l the opening 11 is no longer covered by the passage 20, so that the hot-gas slide is closed. In firm connection with the hot-gas slide valve a second slide valve, is provided, which opens upon the closing of the hot-gas slide valve, or closes upon the opening of the hot-gas slide valve. The function of this slide valve is illustrated in the complete drawing, Figure 5.

Figure 4M:
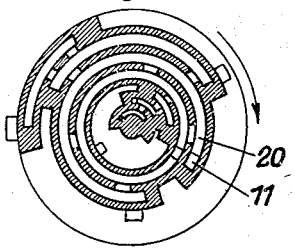

In Figure 4m the hot-gas slide valve is again opened, as the opening 11 is now again located within the annular passage 20. By an additional turn of the plate 5 of 30° all of the valves again assume the position illustrated in Figure 4a.

In Figure 5 there is shown a water-gas producing plant, 30 being the water gas generator which may be provided with a water jacket steam producer connected with a steam drum 29. Steam from this drum or from another source is conducted through the pipe 31 to the generator 30. The steam cock 32 is controlled by the pipe 14 proceeding from the rotary slide valve, by means of the pressure cylinder 33. In this cylinder there is provided a piston 34, which is loaded by a spring 35.

In the event of the pressure agent entering the cylinder through the pipe 14 the pressure of the spring is overcome, and the piston is forced into its extreme position towards the right. By the piston rod 36 the steam cock 32 is opened through the medium of a level mechanism 37, so that steam is able to enter the generator.

In the air main leading from the blower 28 to the generator 30 is provided the primary air slide valve 38, which is opened after the closing of the steam cock, so that air is able to enter the generator 30, whereby the temperature reduced during the gassing period, is increased again. The gases produced during the hot blowing operation pass through the hot-gas slide 39 to the oil carburettor 40. In the latter air is added to the hot blowing gases through the secondary air slide valve 41, so that in the carburettor combustion takes place, the carburettor thus being heated up.

During this time the oil cock 42 is closed. The burnt gases being discharged pass through the opened waste-gas slide valve 43 into a waste heat boiler 44, in which steam may be generated. During the gasing period the steam enters from below into the hot bed of carbonaceous fuel contained in the generator 30, and the generated water gas flows through the opened hot-gas slide valve 39 into the carbuettor 40. There, the oil cock 42, being open, carburetion is able to take place. In the meantime the waste-gas slide valve 43 has been closed, so that the gas is forced to pass through the pipe 45 into the scrubber 46, from which point the same is conducted in the pipe 47 to a gas container or any other point of use. Obviously during this time the secondary air slide valve 41 and the primary air slide valve 38 are closed.

After the gas production has continued for a certain length of time the bed of fuel will have cooled down to such extent that only small amounts of water-gas are formed. When this stage is reached, the steam pipe 31 is closed and in place thereof the steam pipe 48 is opened. It is thus accomplished that in the first period gasification is performed in upward direction, while after closing the steam cock 32 and turning the steam cock 32a gasification is performed in the second period in downward direction. In this case the hot-gas slide valve 39 requires to be closed for a short time, whilst the slide valve 49 in similar fashion must be opened. The changing over of the slides 39 and 49 is preferably performed in combination with the actuation of the steam cock 32a.

It is just as well possible to make the rotary slide valve work in reverse manner by introducing the pressure oil through pipe 8 and by taking off the released oil through pipe 15. There of course the oil has to be introduced to the control cylinders on the other side of the piston, the spring being likewise arranged on the opposite side. The arrangement which has been described before, however, is more advantageous, as by introducing the pressure oil beneath the rotating plate 5 the slide valve moves with perfect ease, whereas in the other arrangement the pressure oil presses plate 5 against the base plate whereby the slide valve moves less easily.

The intermittent movement of the rotary slide valve is effected by means of the device shown in Figures 6 to 8. In these Figures 51 represents a disk connected rigidly to the shaft 52 which is to be turned by a certain angle at predetermined intervals. This turning movement is imparted to the shaft 4 of the rotary slide valve by means of the bevel wheels 2 and 3. The disk 51 carries rigidly connected to it a ring 53 which has a series of recesses 54 on its outer edge as well as a series of recesses 55 on its inner edge. A rod 56 running in the guides 57 is moved in uniform manner upwards and downwards as indicated by the double arrow by means of a suitable operating mechanism, f. i. a crank-gear 71 driven by an electromotor 72 by means of the worm 73 and the worm wheel 74. To the upper end of the rod 56 an engaging device in form of a triangular shaped link 58 is connected pivotally by means of a pin 59. This triangular link 58 which is connected to the rod 56 at the one corner, carries pins 60 and 61 at its other corners, which pins are able to gear with the recesses 54 and 55 of the ring 53 respectively. Rigidly connected to the triangular link 58 and also movable about the pin 59 is a traverse 62, having two hook-shaped projections 63 and 64, one of these projections 63 being longer than the other 64. Below these projections a wheel 65 running on its shaft 66 is arranged. This wheel is advanced to a small extent by each upward movement of the rod 56 by means of a pawl and ratchet mechanism 75 actuated by a stop 76 rigidly connected to the rod 56.

To the edge of the wheel 65 two series of stops or abutments 67 and 68 are fastened. The stops 67 engages with the hook-shaped projection 63, whereas the stops 68 engage with the projection 64.

The operation of the device is the following. In the position shown in the drawings, the pin 60 when moved upwards by the rod 56 is not able to catch the next recess 54a of the ring 53 and therefore the disk 51 is not advanced. By the upward movement of the rod 56 the wheel 65 is advanced in the direction of the arrow. When the stop 68a comes to lie beneath the projection 64 on the traverse 62 the triangular link 58 will tilt over to the right at the following downward movement of the rod 56. By this the pin 61 comes to rest against the inner edge of the ring 53. When now the rod 56 is going upward again the pin 61 engages with the recess 55a and now upon the downward movement of the rod 56 the disk 51 and the rotary plate 5 of the control valve are turned by a certain angle.

When the rod 56 is now going upward again pin 61 cannot reach the next recess in the inner edge of the ring 53 so that no advance of the disk 51 is obtained until the stop 67a comes to engage with the projection 63. Upon this the triangular link 58 is tilted back again and when rod 56 is moving upward stop 60 is able to engage with the next recess 54a at the outer edge of the ring 53 and thus the turning of the disk 51 by a certain angle is attained.

What I claim as new and desire to secure by Letters Patent is:

1. A means for automatically controlling the passage of a fluid under pressure through a series of pipes, including a pressure chamber, and a rotating element formed with a series of concentrically arranged annular recesses of different circumferential length, with the recesses cooperating respectively with the pipes opening into said recesses at different distances from the axis of the rotating element, said rotating element in its various positions selectively establishing communication between a selected pipe or pipes and the pressure chamber for the admission of motive fluid under pressure and the communication of the remaining pipe or pipes with a discharge to relieve pressure.

2. A means for automatically controlling the passage of a fluid under pressure though a series of pipes, including a pressure chamber, a rotating element formed with a series of concentrically arranged annular recesses of different circumferential length, with the recesses cooperating respectively with the pipes opening into said recesses at different distances from the axis of the rotationg element, said rotating element in its various positions selectively establishing communication between a selected pipe or pipes and the pressure chamber for the admission of motive fluid under pressure and the communication of the remaining pipe or pipes with a discharge to relieve pressure, and means for selectively controlling the rotation of the element.

3. A means for automatically controlling the passage of a fluid under pressure through a series of pipes, including a pressure chamber, a rotating element simultaneously cooperating with all pipes and capable of being arranged in a plurality of independent positions, said rotating element in its various positions selectively establishing communication between a selected pipe or pipes and the pressure chamber for the admission of motive fluid under pressure and the communication of the remaining pipe or pipes with a discharge to relieve pressure, means for selectively controlling the rotation of the element, said means including a stepped wheel having connection with the element, means for selectively operating such wheel, said mechanism including a pawl, means for positioning the pawl, and means for reciprocating the pawl in cooperation with the stepped wheel.

4. A means for automatically controlling the delivery of fluid under pressure through a series of independent pipes, including a pressure chamber, a rotating element simultaneously cooperating with all pipes and capable of being arranged in a plurality of independent positions, said rotating element in its various positions selectively establishing communication between a selected pipe or pipes and the pressure chamber for the admission of motive fluid under pressure and the communication of the remaining pipe or pipes with a discharge to relieve pressure, means for selectively controlling the rotation of the element, said means including a stepped wheel having connection with the element, means for selectively operating such wheel, said mechanism including a pawl, means for positioning the pawl, and means for reciprocating the pawl in cooperation with the stepped wheel, said positioning means being selectively variable.

5. A control means including a plurality of pipes for admitting a pressure medium, a pressure chamber, a rotary element within the pressure chamber, said element being formed with a series of concentrically arranged annular channels of different circumferential lengths, with the open ends of the pipes communicating respectively with the channels at relatively different distances from the axis of the element, certain of the channels of the rotary member communicating with the pressure chamber, certain of the channels of the rotary member communicating with a discharge providing for a relief of the pressure in said pipes, and means for selectively positioning said rotary member for simultaneous control of all pipes, with the result of communicating certain of the pipes with the pressure chamber and certain of the pipes with the relief discharge.

6. A rotary valve comprising a fixed plate having an inlet aperture through which pressure fluid may be fed, a base plate formed with outlet apertures for directing pressure fluid to parts to be operated, and a rotary plate resting on the base plate and provided with recesses to establish communication between the inlet aperture and the outlet apertures, said recesses being concentrically arranged, of relatively different circumferential lengths, and disposed at relatively different distances from the center of the rotary plate, and means for setting the rotary plate in a selected relation to the apertures in the base plate.

7. A rotary valve for the purpose set forth, comprising a fixed plate having an inlet aperture for pressure fluid, a base plate having a plurality of outlet apertures for directing pressure fluid to parts to be operated, a rotary plate resting on the base plate and having channels for selectively establishing communication between the inlet aperture and the outlet apertures in the base plate, means for setting the rotary plate in a selected relation to the base plate, a casing open to the apertures in the fixed plate and the rotary plate.

8. A rotary valve comprising a fixed plate having an inlet for pressure fluid, a base plate formed with a plurality of outlets for directing pressure fluid to parts to be operated, a rotary plate resting on the base plate and having concentric arcuate channels of relatively different lengths to establish communication between the inlet and the outlets, said channels being arranged at relatively different radial distances from the center of the rotary plate, and means to set the rotary plate in a selected relation to the inlet and the outlets.

9. In a rotary slide valve for the simultaneous control of a plurality of valves actuated by means of a pressure agent which acts upon pistons running in cylinders, the valves being connected to the pistons, a fixed base plate, an aperture in this base plate, a pipe for conducting the pressure agent to this aperture, other apertures in this base plate arranged at different distances from the center of the plate, pipes for connecting these other apertures with the cylinders, a rotary plate adapted to move over the base plate, a series of concentrically arranged annular recesses of different circumferential length in said rotary plate for connecting at certain positions of the rotary plate the aperture to which the pressure agent is conducted with selected apertures which are connected with the cylinders, a casing for covering the rotative plate, a pipe for discharging the pressure agent from this casing, a shaft for turning the rotary plate, and means for intermittently moving this shaft.

10. In a rotary slide valve for the simultaneous control of a plurality of valves actuated by means of a pressure agent which acts upon pistons running in cylinders, the valves being connected to the pistons, a fixed base plate, an aperture in this base plate, a pipe for conducting the pressure agent to this aperture, other apertures in this base plate, pipes for connecting these other apertures with the cylinders, a rotary plate adapted to move over the base plate, annular recesses in said rotary plate for connecting at certain positions of the rotary plate the aperture to which the pressure agent is conducted with the apertures which are connected with the cylinders, a casing for covering the rotative plate, a pipe for discharging the pressure agent from this casing, a shaft for turning the rotary plate, a bevel wheel connected rigidly to this shaft, a second shaft, a bevel wheel on this shaft intermeshing with the bevel gear on the shaft of the rotary plate, a disk connected rigidly to the second shaft, a ring rigidly connected to this disk, recesses on the inner and on the outer edge of said ring, an upward and downward moving tiltable engaging device, a stop on this engaging device adapted to engage in one position of the tiltable engaging device with the recesses on the inner edge of said ring, a stop on this engaging device adapted to engage in the other position of the tiltable engaging device with the recesses on the outer edge of said ring, and means for tilting said engaging device from one position into the other and back again at predetermined intervals.

11. In a rotary slide valve for the simultaneous control of a plurality of valves actuated by means of a pressure agent which acts upon pistons running in cylinders, the valves being connected to the pistons, a fixed base plate, an aperture in this base plate, a pipe for conducting the pressure agent to this aperture, other apertures in this base plate, pipes for connecting these other apertures with the cylinders, a rotary plate adapted to move over the base plate, annular recesses in said rotary plate for connecting at certain positions of the rotary plate the aperture to which the pressure agent is conducted with the apertures which are connected with the cylinders, a casing for covering the rotative plate, a pipe for discharging the pressure agent from this casing, a shaft for turning the rotary plate, a bevel wheel connected rigidly to this shaft, a second shaft, a bevel wheel on this shaft intermeshing with the bevel gear on the shaft of the rotary plate, a disk connected rigidly to the second shaft, a ring rigidly connected to this desk, recesses on the inner and on the outer edge of said ring, an upward and downward moving tiltable engaging device, a stop on this engaging device adapted to engage in one position of the tiltable engaging device with the recesses on the inner edge of said ring, a stop on this engaging device adapted to engage in the other position of the tiltable engaging device with the recesses on the outer edge of said ring, a traverse, connected rigidly with said engaging device, a long projection and a short projection on said traverse, a wheel, means for rotating this wheel in uniform manner, stops at the edge of said wheel adapted to engage with the long projection on said traverse and to tilt the engaging device in one direction, stops at the edge of said wheel adapted to engage with the short projection on said traverse and to tilt the engaging device in the other direction, and means for fastening these stops at the edge of said wheel.

12. In a rotary slide valve for the simultaneous control of a plurality of valves actuated by means of a pressure agent which acts upon pistons running in cylinders, the valves being connected to the pistons, a fixed base plate, an aperture in said base plate, a pipe for conducting the pressure agent to this aperture, other apertures in said base plate, pipes for connecting these other apertures with the cylinders, a rotary plate adapted to move over the base plate, annular recesses in said rotary plate for connecting at certain positions of the rotary plate the aperture to which the pressure agent is conducted with the apertures which are connected with the cylinders, a casing for covering the rotative plate, a pipe for discharging the pressure agent from this casing, a shaft for turning the rotary plate, a bevel wheel connected rigidly to this shaft, a second shaft, a bevel wheel on this shaft intermeshing with the bevel gear on the shaft of the rotary plate, a disk connected rigidly to the second shaft, a ring rigidly connected to this disk, recesses on the inner and on the outer edge of said ring, an upward and downward moving tiltable engaging device, a stop on this engaging device adapted to engage in one position of the tiltable engaging device with the recesses on the inner edge of said ring, a stop on this engaging device adapted to engage in the other position of the tiltable engaging device with the recesses on the outer edge of said ring, a traverse, connected rigidly with said engaging device, a long projection and a short projection on said traverse, a wheel, means for rotating this wheel in uniform manner, stops at the edge of said wheel adapted to engage with the long projections on said traverse and to tilt the engaging device in one direction, stops at the edge of said wheel adapted to engage with the short projection on said traverse and to tilt the engaging device in the other direction, a series of thread holes near the circumference of said wheel, and screws for fastening the said stops at the edge of said wheel.

WILLY STEINBERG.